R. I. MEYERHOLZ.
AUTOMOBILE ROBE.
APPLICATION FILED JUNE 16, 1917.
1,394,208.
Patented Oct. 18, 1921.
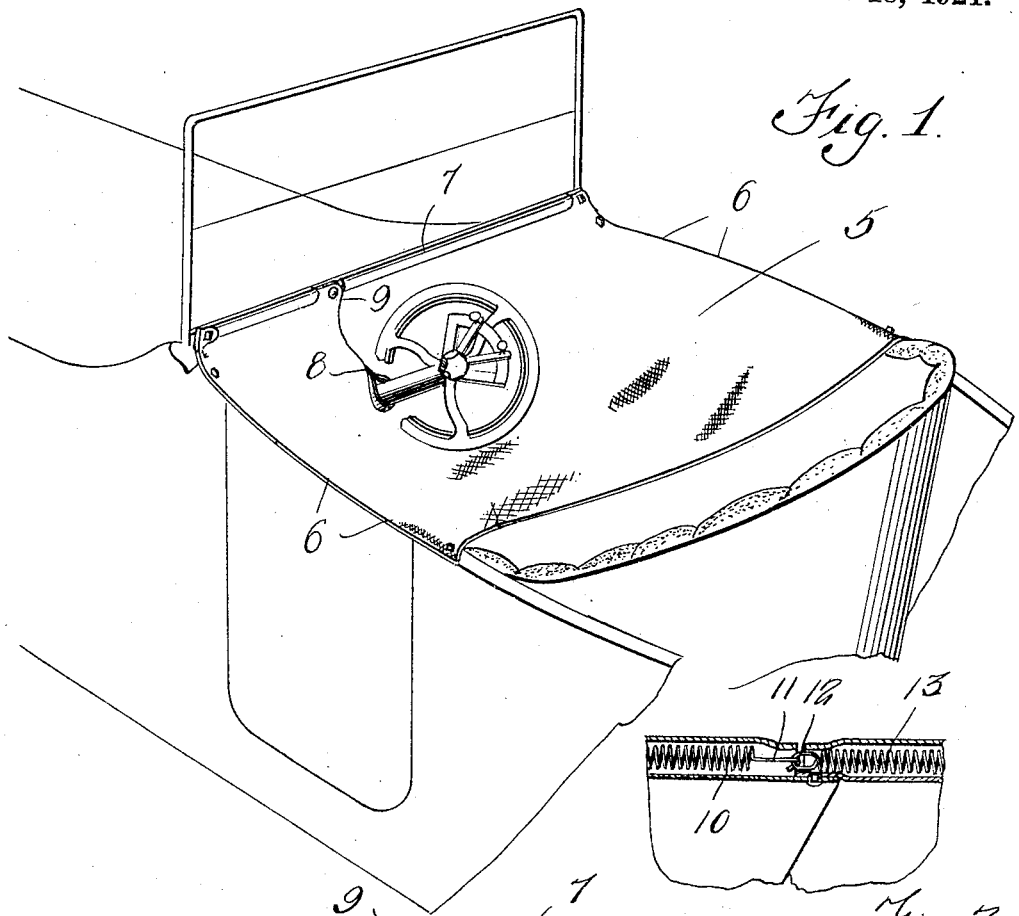
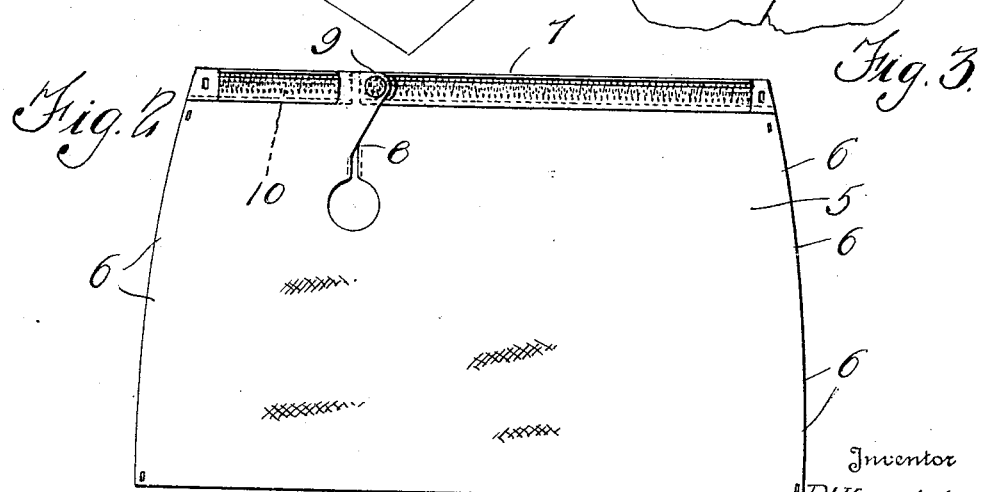

UNITED STATES PATENT OFFICE.

RHEINIER IVAN MEYERHOLZ, OF CUPERTINO, CALIFORNIA.

AUTOMOBILE-ROBE.

1,394,208. Specification of Letters Patent. Patented Oct. 18, 1921.

Application filed June 16, 1917. Serial No. 175,130.

*To all whom it may concern:*

Be it known that I, RHEINIER IVAN MEYERHOLZ, a citizen of the United States, residing at Cupertino, in the county of Santa Clara and State of California, have invented certain new and useful Improvements in Automobile-Robes; and I do hereby declare the following to be a full, clear, and exact description of the invention, such as will enable others skilled in the art to which it appertains to make and use the same.

This invention has for its object to provide an improved robe and means for fastening it in position on an automobile or other vehicle to protect the occupants.

Another object is the provision of means for resiliently retaining the front edge of the robe in engagement with the windshield or dashboard of the vehicle to prevent the admission of air.

With these and other objects in view, the invention consists in the novel construction, combination and arrangement of parts as will be hereinafter specifically described, claimed and illustrated in the accompanying drawing, in which:

Figure 1 represents a perspective view, partly broken away, of a motor vehicle illustrating the invention applied to use, Fig. 2 represents a plan view of the robe removed, and Fig. 3 represents a fragmentary sectional view through the robe, illustrating the spring retaining means in detail.

Referring to the drawing in detail, wherein similar reference numerals designate corresponding parts throughout the several views, the numeral 5 indicates a robe constructed of any desired fabric and of such size as to fit over and cover the seat compartment of the vehicle. The opposite side edges of the robe are formed with eyelets 6, and the front edge is turned back and secured to provide an elongated loop or seam 7. The front portion of the robe is formed with an inwardly extending slit 8 and the adjacent edges of the slit are provided with the parts of a preferred type of snap fastener 9, by which the slit is held in closed position. The slit 8 is designed to accommodate the steering posts of the motor vehicle, as clearly shown in Fig. 1.

One end of a spring 10 is secured to the left side edge of the robe 5, extends through the loop 7 and is provided at its opposite terminal with a loop 11, adapted to receive a hook 12 carried by a spring 13 arranged in the portion of the loop 7 at the right of the slit 8. The outer terminal of the spring 13 is secured to the side edge of the robe 5 in any suitable manner.

The side walls and doors of the vehicle are provided at their upper edges with turn-buttons, or other suitable types of fasteners 14, adapted to engage in the openings 6 in the side edges of the robe 5, whereby the latter is secured in position upon the vehicle 15. The steering post of the vehicle is received in the rear end of the slit 8 and the latter is held in closed position by the fastener 9. The hooked terminal 12 of the spring 13 is engaged in the eye or loop 11 of the spring 10 and yieldably retains the front edge of the robe against the dashboard or windshield of the vehicle to insure against the admission of air and the rear edge of the robe overlies the occupants of the vehicle.

What I claim is:

1. An automobile robe having a slit extending inwardly from the front marginal edge to receive the steering post, a resilient member adjacent said edge to cause the robe to snugly fit the dash board, said member being in separable sections, means for fastening the robe to the automobile so that it will be substantially immovable at the outer ends of the member to facilitate attachment and detachment of the sections of the member, said separable connection being adjacent said slit.

2. An automobile robe having a slit extending inwardly from the front marginal edge to receive the steering post, means facilitating fastening of the robe adjacent its front outer ends so as to be substantially immovable laterally, a spring secured to the robe, an inclosing tube for the spring adjacent said front edge, said spring maintaining the robe in snug relation with the dash board, said spring being separable adjacent said slit and the tubes being loose relative to the spring at the slit so that the robe portions may be readily separated at the slit to engage the spring, and one portion of the robe at the slit overlapping the other portion to protect the separable portion of the spring.

In testimony whereof I affix my signature in presence of two witnesses.

RHEINIER IVAN MEYERHOLZ.

Witnesses:
CHAS. O. MULLIN,
R. D. MCGOWAN.